United States Patent
Loccufier et al.

(10) Patent No.: US 12,195,631 B2
(45) Date of Patent: *Jan. 14, 2025

(54) AQUEOUS DISPERSION OF RESIN PARTICLES

(71) Applicant: AGFA-GEVAERT NV, Mortsel (BE)

(72) Inventors: Johan Loccufier, Mortsel (BE); Ellen Bertels, Mortsel (BE); Jos Louwet, Mortsel (BE)

(73) Assignee: Agfa-Gevaert NV, Mortsel (BE)

( * ) Notice: Subject to any disclaimer, the term of this patent is extended or adjusted under 35 U.S.C. 154(b) by 749 days.

This patent is subject to a terminal disclaimer.

(21) Appl. No.: 17/298,699

(22) PCT Filed: Nov. 25, 2019

(86) PCT No.: PCT/EP2019/082396
§ 371 (c)(1),
(2) Date: Jun. 1, 2021

(87) PCT Pub. No.: WO2020/114819
PCT Pub. Date: Jun. 11, 2020

(65) Prior Publication Data
US 2022/0049116 A1    Feb. 17, 2022

(30) Foreign Application Priority Data
Dec. 5, 2018   (EP) .................................... 18210388

(51) Int. Cl.
| C09D 11/30 | (2014.01) |
| B41M 5/00 | (2006.01) |
| C09D 11/033 | (2014.01) |
| C09D 11/102 | (2014.01) |

(52) U.S. Cl.
CPC ........... C09D 11/30 (2013.01); B41M 5/0023 (2013.01); C09D 11/033 (2013.01); C09D 11/102 (2013.01)

(58) Field of Classification Search
CPC ..... C09D 11/30; C09D 11/033; C09D 11/102; B41M 5/0023
See application file for complete search history.

(56) References Cited

U.S. PATENT DOCUMENTS

| 2012/0306976 A1 | 12/2012 | Kitagawa et al. |
| 2017/0327625 A1 | 11/2017 | Du Prez et al. |

FOREIGN PATENT DOCUMENTS

| EP | 2 933 374 A1 | 10/2015 |
| EP | 3 441 223 A1 | 2/2019 |
| JP | 2011140560 A | 7/2011 |
| JP | 2015163678 A | 9/2015 |
| WO | 2005/083017 A1 | 9/2005 |
| WO | 2009/137753 A1 | 11/2009 |
| WO | 2018/234179 A2 | 12/2018 |

OTHER PUBLICATIONS

International Search Report dated Feb. 19, 2020 relating to PCT/EP2019/082396, 4 pages.
Written Opinion dated Feb. 19, 2020 relating to PCT/EP2019/082396, 6 pages.

Primary Examiner — Ling Siu Choi
Assistant Examiner — Andrea Wu
(74) Attorney, Agent, or Firm — Leydig, Voit & Mayer, Ltd.

(57) ABSTRACT

An aqueous dispersion of resin particles comprising a dispersing group covalently bonded to the resin and at least one repeating unit of formula I, II and/or III and which is obtainable by contacting a compound A comprising 2 functional groups selected from the group of functional groups —X—C(=O)—CHR1-C(=O)—R2, —X—C(=O)—C≡C—R2; or —X—C(=O)—CR1=CR2-NR11 R12, wherein X, R1, R2, R3, R11 and R12 have the same meaning as that defined in the claims, with a compound B comprising at least two —NH$_2$, —NH$_3^+$ or —N=C=O, with a crosslinking agent C. The invention also includes a method of producing the aqueous dispersion and further relates to an aqueous ink jet ink comprising the resin particles.

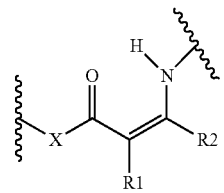

(I)

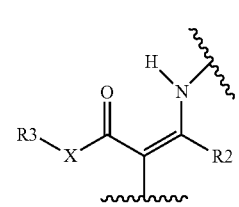

(II)

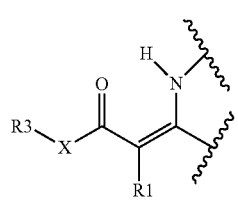

(III)

15 Claims, No Drawings

AQUEOUS DISPERSION OF RESIN PARTICLES

REFERENCE TO RELATED APPLICATIONS

This application is a 371 National Stage Application of PCT/EP2019/082396, filed Nov. 25, 2019, which claims the benefit of European Application No. 18210388.7, filed Dec. 5, 2018, the contents of which are incorporated by reference herein in their entirety.

TECHNICAL FIELD

The present invention relates to aqueous dispersions of resin particles, the resin comprising dynamic covalent polymeric chains and dispersing groups. The dispersion can be used in aqueous pigment formulations such as aqueous based paints, inks, inkjet inks.

BACKGROUND ART

In recent years, inkjet techniques have been increasingly utilized for industrial applications such as displays, posters, bulletin boards, packaging, textile, etc. In such applications durability such as light fastness, water resistance, solvent resistance and wear resistance are important requirements of the printed images and pigment based inks therefore have been developed.

Inks, such as solvent-based inkjet inks using an organic solvent as a vehicle, and ultraviolet curable inkjet inks including a polymerisable monomer as a main component have been used widely in industrial applications.

However, the solvent-based inkjet inks are not environmentally preferable because the solvent is evaporated in the atmosphere, and the ultraviolet curable inkjet inks have limited application fields because they may have skin sensitizing properties depending on the monomer to be used and an expensive ultraviolet irradiation apparatus is required to be incorporated to the main body of a printer. Furthermore, ultraviolet inkjet inks may suffer from bad adhesion on 'difficult' substrates such as polypropylene.

In view of such background, there have been developed pigments based aqueous inks for inkjet recording capable of being directly used for printing on porous and non-porous substrates and which give less environmental load. These inks are characterized by the presence of a resin which binds the pigments and prevents rubbing off the images from the substrate and further also leading to a sufficient solvent and scratch resistance.

JP2011140560A discloses a polyurethane resin as a binder for an aqueous ink jet ink. The urethane resin provides images with high abrasion resistance and a high alkali resistance, and at the same time a good storage and jetting stability is obtained. No data on chemical resistance against organic solvents and adhesion onto non-porous substrates such as polyvinyl chloride or PET of the printed images are disclosed. Resistance of printed images against organic solvents such as IPA (Isopropanol) is very preferred as this organic solvent is frequently used to clean the images, especially if these images are printed for outdoor applications such as on vehicles, banners, posters etc. . . Improvements are always further needed.

JP2015163678A discloses an aqueous pigment composition for printing on a porous substrate such as textile which guarantees an improved washing fastness and rubbing resistance of the images on the fabric. The aqueous composition comprises pigment particles containing a urethane resin obtained by reacting polyester polyols, polyols with an ionic or non-ionic group and polyisocyanate.

To bind the pigments to the different types of textile fabrics, reactive binder technology has been introduced into the inks. This binding is required to achieve a satisfactory level in wash fastness and fastness during rubbing, also known as crock fastness. Several approaches have been disclosed in the patent literature.

WO2005/083017 discloses an ink for textile printing comprising specific wetting agents for spreading control. The inks comprise a polyurethane as pigment dispersing agent in combination with a melamine as fixing agent.

WO2009/137753 discloses an ink composition comprising a colorant, a specific crosslinked polyurethane designed for hydrolytical stability and a post curing agent selected from the group consisting of amide and amine formaldehyde resins, phenolic resins, urea resins and blocked isocyanates, with melamine formaldehyde resins as preferred embodiment.

US2012/0306976 discloses an ink comprising a pigment, a dispersing agent for said pigment, typically an acrylate based resin, a water soluble fixing agent, typically a water soluble polymer such as a poly(vinyl alcohol) derivative or a polyurethane based resin and a crosslinking agent, preferably a blocked isocyanate capable of crosslinking the dispersant and the polymer fixing agent upon thermal treatment at a temperature of at least 100° C.

EP29333374 discloses the use of encapsulated reactive chemistry in pigment containing aqueous inkjet inks, to manufacture printed textiles. Blocked isocyanates are disclosed as preferred reactive chemistry upon thermal treatment. These blocked isocyanates are multifunctional low molecular weight blocked isocyanates which can, if not completely consumed during the thermal treatment, may lead to health and safety issues when the printed textile comes into contact with the consumer.

In general, crosslinkers are used in ink and paint formulations to further improve physical properties of coatings and images (scratchability, solvent resistance and water resistance) on substrates such as metal, wood, plastic, etc. However, upon curing and/or drying, adhesion of pigments to these substrates may become worse with respect to cross-linker free formulations due to shrinkage in the polymeric film when crosslinking occurs. The shrinkage which occurs onto crosslinking causes internal stress in the binder/pigment system. This stress leads to less adhesion and less scratch resistance.

In the unpublished patent application PCT/EP2018/065946, resin particles having these dynamically exchange crosslinking bonds at elevated temperatures such as vinylogous-urethane, vinylogous-amide or vinylogous urea have been made via interfacial polymerisation. In order to disperse the formed resin particles into an aqueous dispersion, dispersants have been added to the formulation. Due to the interaction between these dispersants with the dispersants of the pigment in e.g. an aqueous ink formulation, storage stability problems of the ink are likely to occur.

On one hand there is the need for an approach that allows to achieve a satisfactory binding between the pigment in aqueous pigment formulations (such as an aqueous inkjet ink) and multiple substrates (such as the textile fabrics and non-porous substrates) without the need of reactive chemistry (such as blocked isocyanates and formaldehyde based crosslinkers) and which further positively affect the physical properties (such as adhesion, solvent resistance, wash fastness, crock fastness) of the formed coating or image.

SUMMARY OF INVENTION

It is the objective of the present invention to provide a solution to the above stated problems. The objective has been achieved by providing an aqueous dispersion of polymeric particles as defined in claim 1.

It is further an object of the present invention to provide an inkjet ink comprising the above-mentioned particles as defined in claim 8.

It is another embodiment of the invention to provide a production method of the above-mentioned dispersion of polymeric particles as defined in claim 9.

One of the additional advantages of the polymeric particles of the aqueous dispersion as defined in claim 1, is that no reactive chemistry such as isocyanates are required in the preparation step of the dispersion.

Other features, elements, steps, characteristics and advantages of the present invention will become more apparent from the following detailed description of preferred embodiments of the present invention. Specific embodiments of the invention are also defined in the dependent claims.

DESCRIPTION OF EMBODIMENTS

According to a first aspect of the present invention, an aqueous dispersion of resin particles is provided, said resin comprising a dispersing group or dispersing group precursor covalently bonded to the resin and at least one repeating unit of formula (I), (II), and/or (III),

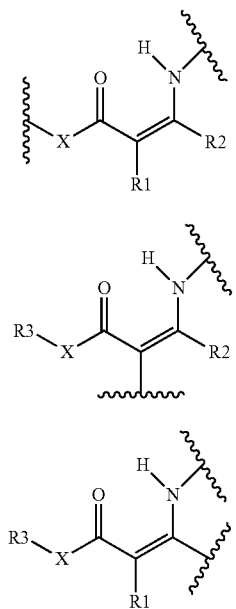

wherein R1 is selected from the group consisting of a hydrogen, a substituted or unsubstituted alkyl group, a substituted or unsubstituted alkenyl group, a substituted or unsubstituted alkynyl group, a substituted or unsubstituted aryl or heteroaryl group, a substituted or unsubstituted aralkyl group, a substituted or unsubstituted alkaryl group, $C(=O)R4$ and CN R2 is selected from the group consisting of a hydrogen, a substituted or unsubstituted alkyl group, a substituted or unsubstituted alkenyl group, a substituted or unsubstituted alkynyl group, a substituted or unsubstituted aryl or heteroaryl group, a substituted or unsubstituted aralkyl group, a substituted or unsubstituted alkaryl group and $C(=O)R4$ R1 and R2 may represent the necessary atoms to form a five to eight membered ring R3 is selected from the group consisting of a substituted or unsubstituted alkyl group, a substituted or unsubstituted alkenyl group, a substituted or unsubstituted alkynyl group, a substituted or unsubstituted aralkyl group, a substituted or unsubstituted alkaryl group and a substituted or unsubstituted aryl or heteroaryl group R4 is selected from the group consisting of a hydrogen, a substituted or unsubstituted alkyl group, a substituted or unsubstituted alkenyl group, a substituted or unsubstituted alkynyl group, a substituted or unsubstituted aryl or heteroaryl group, a substituted or unsubstituted aralkyl group, a substituted or unsubstituted alkaryl group, OR5 and NR6R7

R5 is selected from the group consisting of a substituted or unsubstituted alkyl group, a substituted or unsubstituted alkenyl group, a substituted or unsubstituted alkynyl group, a substituted or unsubstituted aralkyl group, a substituted or unsubstituted alkaryl group and a substituted or unsubstituted aryl or heteroaryl group R6 and R7 are independently selected from the group consisting of a hydrogen, a substituted or unsubstituted alkyl group, a substituted or unsubstituted alkenyl group, a substituted or unsubstituted alkynyl group, a substituted or unsubstituted aralkyl group, a substituted or unsubstituted alkaryl group and a substituted or unsubstituted aryl or heteroaryl group R6 and R7 may represent the necessary atoms to form a five to eight membered ring X is selected from the group consisting of O, NR8 and CR9R10

R8, R9 and R10 are independently selected from the group consisting of a hydrogen, a substituted or unsubstituted alkyl group, a substituted or unsubstituted alkenyl group, a substituted or unsubstituted alkynyl group, a substituted or unsubstituted aralkyl group, a substituted or unsubstituted alkaryl group and a substituted or unsubstituted aryl or heteroaryl group R8 and R3 may represent the necessary atoms to form a five to eight membered ring any of R3, R9 and R10 may represent the necessary atoms to form a five to eight membered ring, and which is obtainable by contacting in a liquid, a compound A comprising 2 functional groups selected from the group of functional groups —X—C(=O)—CHR1-C(=O)—R2, —X—C(=O)—C≡C—R2; or —X—C(=O)—CR1=CR2-NR11R12 wherein R11 and R12 are independently selected from the group consisting of a hydrogen, a substituted or unsubstituted alkyl group, a substituted or unsubstituted alkenyl group, a substituted or unsubstituted alkynyl group, a substituted or unsubstituted aralkyl group, a substituted or unsubstituted alkaryl group and a substituted or unsubstituted aryl or heteroaryl group, with a compound B comprising 2 functional groups selected from —NH₂, —NH₃⁺ and —N=C=O and a crosslinking agent C being a compound comprising at least 3 functional groups selected from the group of functional groups —X—C(=O)—CHR1-C(=O)—R2, —X—C(=O)—C≡C—R2; or —X—C(=O)—CR1=CR2-NR11R12 and/or a compound comprising at least 3 functional groups selected from —$NH_2$, —$NH_3^+$ and —N=C=O, and wherein the compound A and/or the compound B further comprises a dispersing group or a dispersing group precursor.

By reacting compound A comprising 2 functional groups with compound B, also comprising 2 functional groups, only linear resin chains can be obtained. By adding a crosslinking agent C, being a compound having at least 3 functional groups, crosslinking between the linear chains is achieved and a network of the obtained resin is formed. This network leads to improved physical properties (such as adhesion, solvent resistance, wash fastness, crock fastness) of the formed coatings or images from aqueous formulations (such as paints or inks) including the resin particles.

In some preferred embodiments, the resin composition of the particles is made of vinylogous-urethane, vinylogous-amide, vinylogous-urea units or a combination thereof. Vinylogous urethanes are compounds containing the chemical functionality —N—C=C—C(=O)—O—. Vinylogous urea are compounds containing the chemical functionality —N—C=C—C(=O)—NR—. Vinylogous amide are compounds containing the chemical functionality —N—C=C—C(=O)—CRR'—.

In a preferred embodiment, the resin particle according to the present invention comprises at least one moiety according to formula I. In a further preferred embodiment, X represents 0. In a further preferred embodiment R1 is selected from the group consisting of a hydrogen, a substituted or unsubstituted alkyl group and a substituted or unsubstituted aryl group, a hydrogen being particularly preferred. In another preferred embodiment, R2 is selected from the group consisting of a substituted or unsubstituted alkyl group, a substituted or unsubstituted aralkyl group, a substituted or unsubstituted alkaryl group and a substituted or unsubstituted aryl group. In the most preferred embodiment R2 represents a C1 to C6 alkyl group, a methyl group being the most preferred.

A. Preparation of the Aqueous Dispersion

A.1. Liquid

The aqueous dispersion according to the invention can be obtained by reacting at least compound A with compound B and with the crosslinking agent in a liquid wherein all compounds are soluble. Preferably the organic solvent is selected from the group of ketones such as acetone and methyl ethyl ketone, ethers such as tetrahydrofuran, dioxalane, dioxane, glycol ethers, acetates such as ethyl acetate and butyl acetate, nitriles such as acetonitrile, and amides such as dimethyl formamide, N-methylpyrrolidone and N-ethylpyrrolidone and others like xylene. These may be used singly or in combinations of two or more. Once the reaction between compound A, B and the crosslinking agent is complete, hence the amount of one of these compounds is substantially zero, the reaction mixture comprising the formed resin is brought into a liquid comprising water where the resin is becoming a particle. The organic solvent is then removed by evaporation, pervaporation, membrane techniques or distillation.

The particles of the obtained aqueous dispersion have a numeric average diameter of between 10 nm and 100 μm, preferably between 15 nm and 10 μm, more preferably between 20 nm and 1 μm.

The obtained aqueous dispersion has an amount of resin between 1 wt. % and 80 wt. %, preferably between 5 and 50 wt. %, more preferably between 7 wt. % and 15 wt. %.

A.2. Compound A

Compound A comprises 2 functional groups selected from the group of functional groups of formula —X—C(=O)—CHR1-C(=O)—R2, —X—C(=O)—C≡C—R2; or —X—C(=O)—CR1=CR2-NR11R12 wherein R11 and R12 are independently selected from the group consisting of a hydrogen, a substituted or unsubstituted alkyl group, a substituted or unsubstituted alkenyl group, a substituted or unsubstituted alkynyl group, a substituted or unsubstituted aralkyl group, a substituted or unsubstituted alkaryl group and a substituted or unsubstituted aryl or heteroaryl group and must comprise a dispersing group or dispersing group precursor, if no dispersing group is present in compound B. By incorporating a dispersing group in compound A and/or compound B, the dispersing group is covalently bonded to the resin obtained by reacting compound A with compound B.

The dispersing group can be an anionic, cationic group or a non-ionic group, preferably a polyalkylene oxide chain. Preferably the polyalkylene oxide chain is covalently bonded to the resin as a first dispersing group and an anionic or cationic dispersing group is covalently bonded to the resin as a second dispersing group. The combination of a first and a second dispersing group increases the colloidal stability of the aqueous dispersion of the resin particles. The anionic dispersing group is preferably selected from the group consisting of a carboxylic acid or salt thereof, a sulfonic acid or salt thereof, a phosphoric acid ester or salt thereof, a phosphonic acid or salt thereof. The cationic dispersing group is preferably selected from the group consisting of an ammonium group, a sulfonium group, a phosphonium group. The polyalkylene oxide chain is preferably a polyethylene oxide group. Particular preferred combinations are a polyethylene oxide group and a carboxylic acid or salt thereof, or a polyethylene oxide group and an ammonium group.

Dispersing group precursors are functional groups which become charged when e.g. the pH of the aqueous medium is changed e.g. amines which are protonated when the pH of the aqueous dispersion is lowered below the pK-value and lead thus to cationic dispersing groups.

Compound A can also be an oligomer or polymer from monomers comprising functional groups selected from the group of functional groups of formula —X—C(=O)—CHR1-C(=O)—R2, —X—C(=O)—C≡C—R2; or —X—C(=O)—CR1=CR2-NR11R12. R1, R2, R11 and R12 have the same meaning as described above.

Preferably, compound A are bis-acetoacetate monomers according to general formula IV General Formula IV

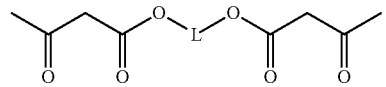

L is a divalent linking group of at least 2 carbon atoms. More preferably, the divalent linking group comprises a dispersing group or dispersing group precursor. The advantage of bis-acetoacetate monomers is that a dispersing group can be easily incorporated by means of a symmetrical synthesis method starting from a diol comprising the dispersing group such as dimethylol propionic acid, 3-(dimethylamino)propane-1,2-diol or a polyether diol and a tert-butyl acetoacetate.

Indeed, compound A can easily be prepared by reacting a β-keto-ester with a diol monomer which comprises a dispersing group. Non-limiting examples of suitable acetoacetates without dispersing group are exemplified in Table 1 of the unpublished patent application PCT/EP2018/065946, incorporated herewith by reference. Non-limiting examples of suitable acetoacetates comprising dispersing groups are exemplified in Table 1:
TABLE 1
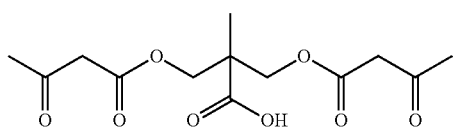 [SMILES: CC(=O)CC(=O)OCC(C)(COC(=O)CC(C)=O)C(=O)O]
A-1
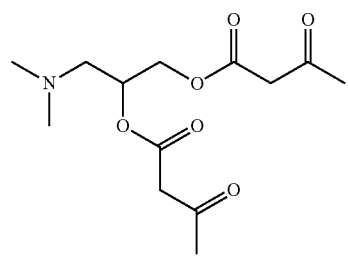 [SMILES: CC(=O)CC(=O)OCC(CN(C)C)OC(=O)CC(C)=O]
A-2
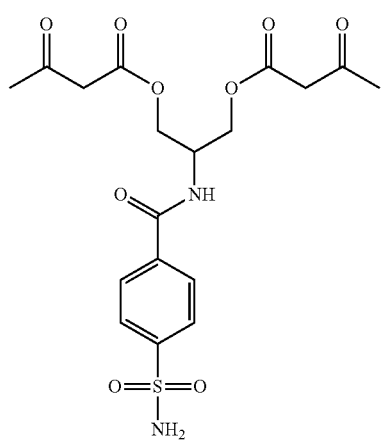 [SMILES: CC(=O)CC(=O)OCC(COC(=O)CC(C)=O)NC(=O)c1ccc(S(N)(=O)=O)cc1]
A-3
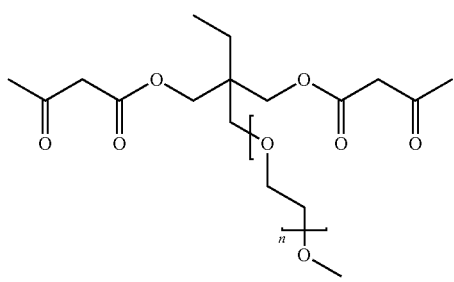
n = 21 on average
A-4
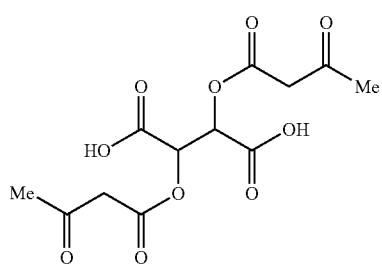 [SMILES: CC(=O)CC(=O)OC(C(=O)O)C(OC(=O)CC(C)=O)C(=O)O]
A-5

TABLE 1-continued
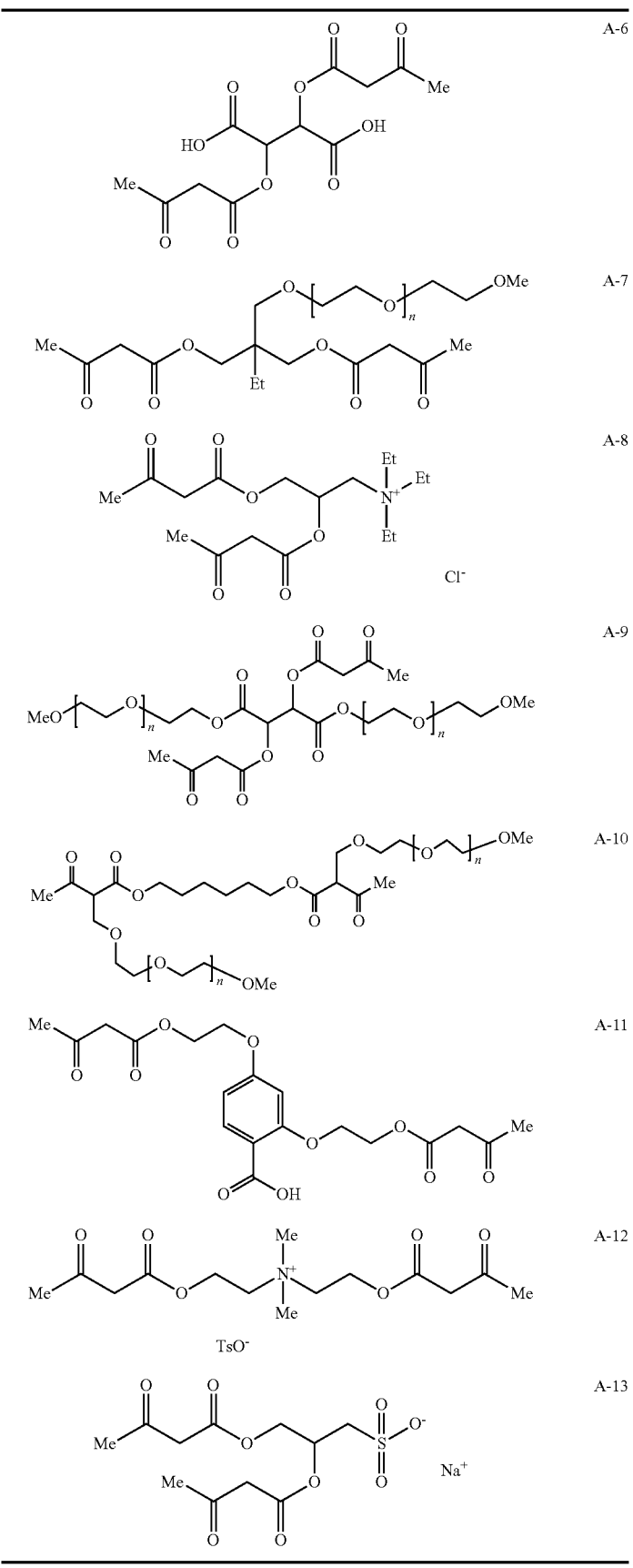

Other examples of compound A are: The reaction product of α-[2,2-bis(hydroxymethyl)butyl]-ω-methoxy poly(oxy-1, 2-ethanediyl) (e.g Ymer N120 Perstorp) and tert.-butyl acetoacetate. The reaction product of N,N,N'-trimethyl-N'-hydroxyethyl-bisaminoethylether (ZF-10, Huntsman) and tert.-butyl acetoacetate. The reaction product of N,N,N'-trimethylaminoethylethanolamine (Z-110, Huntsman) and tert.-butyl acetoacetate.

In a preferred embodiment of the invention, compound A can also be obtained by reacting a β-keto-ester with a polyester polyol, a polycarbonate polyol, a polyether polyol, a polyacrylate polyol, an aliphatic polyester polyol, a polyolefin polyol or a mixture thereof. The introduction of these 'polymeric blocks' will improve the flexibility of the resin chains and hence improve adhesion to the substrate. In a more preferred embodiment, compound A, obtained by reacting a β-keto-ester with a polyester polyol, a polycarbonate polyol, a polyether polyol, a polyacrylate polyol, an aliphatic polyester polyol, a polyolefin polyol or a mixture thereof is combined with a compound A comprising a dispersing group, more preferably a non-ionic dispersing group.

Examples of polycarbonate polyols are e.g. Oxymer C112, Oxymer M112 (available via Perstorp), Kuraray polyol C-2050, C-2090, C-1090 (available from Kuraray), Converge HMA-1 and Converge HMA-1 (available from Novomer Inc.), Duranol T6002, T6001, T5652, T5651, T5650J, T4672, T4671, T4692 and T4691 (available from Asahi kasei).

Very suitable polyester polyols are the ones containing terephthalic ester units and isophthalic ester units in a ratio of 1:1 mol % such as Dynacoll 7150 supplied by Evonik, Marl, Germany, Vylon 220 from Toyobo, Osaka Japan and Elitel 1401 obtained from Unitika Ltd Dusseldorf Germany. Preferably dials with a Mw equal to or less than 400 are used together with the polyester polyol. These polyols can be used singly or as mixture of two or more kinds. Additional suitable aliphatic polyester polyols, are e.g. regular (semi) crystalline or amorphous grades, e.g. based on hexane diol adipates (e.g. Dynacoll 7372 from Evonik) but also polyester polyols based on natural products such as polyester polyols made by using dimer acid or dimer dials (e.g. trade name Priplast from Croda), examples are Priplast 3192 and Priplast 1838. The raw material used to prepare certain Priplast grades, i.e. dimer dials with trade name Pripol can also be used as monomer in the PU synthesis to modify the physical properties and adhesive properties of the coated or printed images.

Incorporating a dispersing group into the resin of the invention can also be performed by using a compound having 1 functional group selected from the group of functional groups of formula —X—C(=O)—CHR1-C(=O)—R2, —X—C(=O)—C≡C—R2; or —X—C(=O)—CR1=CR2-NR11R12, such as 4,6-dioxoheptanoic acid. Due to its monofunctional character, no further condensation is taking place and the dispersing group is situated at the end of the polymeric chain.

A.3. Compound B

Compound B is a compound comprising 2 functional groups selected from the groups of —NH$_2$, —NH$_3^+$ and —N=C=O. Preferably, compound B is a diamine compound. If compound A does not comprise a dispersing group compound B must comprise a dispersing group. The same dispersion group or combinations of dispersing groups as described above in § A.2 can be incorporated in compound B.

If compound B does not comprise a dispersing group, it can be selected from the group comprising diamines. In some embodiments, compound B can be an amine such as those used as isocyanate precursor, such as diamines of the formula R'(—NH$_2$)$_2$, wherein R' is a functional linking group comprising 2 to 20 carbon atoms, selected from aliphatic, cycloaliphatic, aromatic and hetero aromatic groups.

Diamines are particularly preferred as compound B. In a particularly preferred embodiment, said compound B is represented by formula V

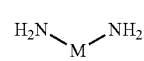

Formula V wherein M is selected from the group consisting of a substituted or unsubstituted alkylene group, a substituted or unsubstituted alkenylene group, a substituted or unsubstituted alkynylene group, a substituted or unsubstituted alkarylene group, a substituted or unsubstituted aralkylene group and a substituted or unsubstituted arylene group, a substituted or unsubstituted alkylene group being particularly preferred.

Compound B may be chosen, for example, from aliphatic amines such as tris(2-aminoethyl)amine, ethylenediamine, tetramethylenediamine, pentamethylenediamine, hexamethylenediamine, diethylenetriamine, triethylenetetramine, tetraethylenepentamine, dihexylenetriamine, cadaverine, putrescine, hexanediamine, spermine, isophorone diamine, dimerised fatty diamine (such as are available commercially under the trade name "Priamine" from Croda International and the trade name "Versamine" from Cognis Corporation) and also aromatic and benzylic amines such as m-xylylenediamine; phenylenediamine, diaminodiphenylmethane, diaminodiphenyl sulfone and methylenebischlorodiethylaniline. Non-limiting examples include m-xylylene diamine; p-xylylenediamine; 1,3-Cyclohexanebis(methylamine), mixture of isomers; 1,2-Diaminocyclohexane; 1,5-Diamino-2-methylpentane; 4,9-Dioxa-1, 12-dodecanediamine; Dytek® EP diamine; 2,2-Dimethyl-1, 3-propanediamine; 2,2'-(Ethylenedioxy)bis(ethylamine); 4,4'-Methylenebis(cyclohexylamine); 4, 7, 10-Trioxa-1,13-tridecanediamine; all jeffamines (commercially available from Huntsman). Non-limiting examples of suitable compounds B are shown in Table 2 of the unpublished patent application PCT/EP2018/065946, incorporated herewith by reference.

Incorporating a dispersing group into the resin of the invention can also be performed by using a compound having 1 functional group selected from the group of functional groups of formula —NH$_2$, —NH$_3^+$ or —N=C=O, such as 4Poly(oxy-1,2-ethanediyl), a-(2-aminoethyl)-ω-methoxy-. Due to its monofunctional character, no further condensation is taking place and the dispersing group is situated at the end of the polymeric chain.

Non-limiting examples of suitable amines comprising dispersing groups are exemplified in Table 2.

TABLE 2

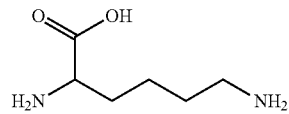

B-1

TABLE 2-continued

| | |
|---|---|
| (structure: 2-amino-5-aminopentanoic acid / ornithine) | B-2 |
| (structure: lysine PEG methyl ester, n = 8 on average) | B-3 |
| (structure: bis-cysteine ethylene dithioether) | B-4 |
| (structure: diethyl-bis(2-aminoethyl)ammonium bromide) | B-5 |
| (structure: H$_2$N-(CH$_2$CH$_2$O)$_n$-CH$_2$CH$_2$-NH$_2$, n = 15 on average) | B-6 |
| (structure: 3,5-diaminobenzoic acid) | B-7 |
| (structure: 3,4-diaminobenzenesulfonic acid) | B-8 |
| (structure: aminoethyl-aminoethyl phosphate) | B-9 |
| (structure: 2,4-diamino-3-hydroxy-succinic acid derivative) | B-10 |

In a preferred embodiment of the invention, compound B can also be a bis amino terminated polymer or oligomer, e.g. bis amino terminated polydimethylsiloxane, other examples are: Wacker Fluid NH$_{15}$D, Wacker Fluid NH40D, Wacker Fluid NH02D, Poly(ethylene glycol), α,ω-bis(amino)-terminated (CAS Number 24991-53-5). Other suitable compounds B can be Jeffamines (available from Huntsman), lysinol and linear polyethyleneimine.

A.4. Crosslinking Agent

The crosslinking agent C, used in the invention can be a compound comprising at least 3 functional groups selected from the group of functional groups —X—C(=O)—CHR1-C(=O)—R2, —X—C(=O)—C≡C—R2; or —X—C(=O)—CR1=CR2-NR11R12 or a compound comprising at least 3 functional groups selected from the groups —NH$_2$, —NH$_3^+$ and —N=C=O.

Preferably, the crosslinking agents suitable in the invention are tris-acetoacetate monomers, trisamines and polyamines, preferably aliphatic trisamines, such as Tris(2-aminoethyl)amine.

Typical examples of preferred crosslinkers are tris-acetoacetate esters of trimethylpropane, glycerol and pentaerythritol, a tetra-acetoacetate ester of pentaerythritol, tris-, tetra-, penta- and hexa-acetoacetate esters of di-pentaerythritol, acetoacetate esters of saccharides such as sorbitol, glucose, mannose and the like, erythritol tetra-acetoacetate and ethoxylated and/or porpoxylated oligomers of these multifunctional alcohols.

Typical examples of preferred multifunctional primary amines tris(2-aminoethyl)amine, 1,2,3-propane triamine, 1,1,1-tris(aminoethyl)ethane, 3,3',3"-triaminotripropylamine, N,N,N',N"-tetrakis(2-aminoethyl)-1,2-diaminoethane, 1,8-diamino-4-(aminomethyl)octane, pentaerythrityl tetraamine, 1,3,5-trisaminomethyl-benzene and amino functionalized dendrimers such as N,N,N',N'-tetrakis(3-aminopropyl)-1,4-diaminobutane, commercially available as Astramol AM-5, PAMAM generation 0 (CASRN155773-72-1) and PAMAM generation 1 (CASRN142986-44-5) and branched polyethyleneimine.

Other preferable examples of crosslinking agents are β-keto-amides derived from the multifunctional amines disclosed above and optionally substituted propiolic acid esters derived from the multifunctional alcohols disclosed above, multifunctional acetoacetamides being particularly preferred.

The amount of crosslinking agent with respect to the total amount of the resin is preferably between 0.5 wt. % and 10 wt. %, more preferably between 1 wt. % and 5 wt. %.

B. Inkjet Ink

The dispersion of the particles according to the invention is suitable to be incorporated in aqueous ink jet inks. The particles are preferably present in the inkjet ink in an amount of no more than 30 wt. %, preferably between 3 and 25 wt. % based on the total weight of the ink.

B.1. Solvent

The aqueous medium of the ink contains water, but may preferably include one or more water-soluble organic solvents. The one or more organic solvents may be added for a variety of reasons. For example, it can be advantageous to add a small amount of an organic solvent to improve the dissolution of a compound in the inkjet ink to be prepared. Preferable water-soluble organic solvents are polyols (e.g., ethylene glycol, glycerin, 2-ethyl-2-(hydroxymethyl)-1,3-propanediol, tetraethylene glycol, triethylene glycol, tripropylene glycol, 1,2,4-butanetriol, diethylene glycol, propylene glycol, dipropylene glycol, butyleneglycol, 1,6-hexanediol, 1,2-hexanediol, 1,5-pentanediol, 1,2-pentanediol, 2,2-dimethyl-1,3-prapanediol, 2-methyl-2,4-pentanediol, 3-methyl-1,5-pentanediol, 3-methyl-1,3-butanediol, and 2-methyl-1,3-propanediol), amines (e.g., ethanolamine, and 2-(dimethylamino)ethanol), monohydric alcohols (e.g., methanol, ethanol, and butanol), alkyl ethers of polyhydric alcohols (e.g., diethylene glycol monomethyl ether, diethylene glycol monobutyl ether, triethylene glycol monomethyl ether, triethylene glycol monobutyl ether, ethylene glycol monomethyl ether, ethylene glycol monobutyl ether, propylene glycol monomethyl ether, propylene glycol monobutyl ether, and dipropylene glycol monomethyl ether), 2,2"-thiodiethanol, amides (e.g., N,N-dimethylformamide), heterocycles (e.g., 2-pyrrolidone and N-methyl-2-pyrrolidone), and acetonitrile.

B.2. Colorants

The colorants which can be included in the ink jet ink can be dyes or pigments.

The pigments may be black, white, cyan, magenta, yellow, red, orange, violet, blue, green, brown, mixtures thereof, and the like. A colour pigment may be chosen from those disclosed by HERBST, Willy, et al. Industrial Organic Pigments, Production, Properties, Applications. 3rd edition. Wiley—VCH, 2004. ISBN 3527305769.

Suitable pigments for use in the ink jet ink of the invention are disclosed in paragraphs [0128] to [0138] of WO 2008/074548. The pigment particles are dispersed in an aqueous medium using a polymeric dispersant, a (anionic) surfactant, but preferably a self-dispersible pigment is used. The latter prevents interaction of the polymeric dispersant with the dispersing groups of resin particles of the invention which may be included in the inkjet ink (see below), since dispersion stability of the pigment is accomplished by the same technique of electrostatic stabilization as employed for the resin particles.

A self-dispersible pigment is a pigment having on its surface covalently bonded ionic hydrophilic groups, such as salt-forming groups, steric groups or the same groups used as dispersing groups for the resin particles, that allow the pigment to be dispersed in an aqueous medium without using a surfactant or a resin.

The technology for making self-dispersible pigments is well-known. For example, EP1220879A discloses pigments having attached a) at least one steric group and b) at least one organic ionic group and at least one amphiphilic counterion, wherein the amphiphilic counterion has a charge opposite to that of the organic ionic group that are suitable for inkjet inks. Also EP906371A discloses suitable surface-modified coloured pigment having attached hydrophilic organic groups containing one or more ionic groups or ionizable groups. Suitable commercially available self-dispersible colour pigments are, for example, the CAB-O-JET™ inkjet colorants from CABOT.

Pigment particles in inkjet inks should be sufficiently small to permit free flow of the ink through the inkjet-printing device, especially at the ejecting nozzles. It is also desirable to use small particles for maximum colour strength and to slow down sedimentation.

The average pigment particle size is preferably between 0.050 and 1 µm, more preferably between 0.070 and 0.300 µm and particularly preferably between 0.080 and 0.200 µm. Most preferably, the numeric average pigment particle size is no larger than 0.150 µm. The average particle size of pigment particles is determined with a Brookhaven Instruments Particle Sizer B190plus based upon the principle of dynamic light scattering. The ink is diluted with demi water to a pigment concentration of 0.002 wt %. The measurement settings of the B190plus are: 5 runs at 23° C., angle of 90°, wavelength of 635 nm and graphics=correction function.

However, for white pigment inkjet inks, the numeric average particle diameter of the white pigment is from about 50 to about 950 nm, more preferably from about 75 to about 750 nm, and still more preferably from about 100 to about 500 nm.

Suitable white pigments are given by Table 2 in [0116] of WO 2008/074548. The white pigment is preferably a pigment with a refractive index greater than 1.60. The white pigments may be employed singly or in combination. Preferably titanium dioxide is used as pigment with a refractive index greater than 1.60. Suitable titanium dioxide pigments are those disclosed in [0117] and in [0118] of WO 2008/074548. Also special colorants may be used, such as fluorescent pigments for special effects in clothing, and metallic pigments for printing a luxury look of silver and gold colours on textiles.

Suitable polymeric dispersants for the pigments are copolymers of two monomers but they may contain three, four, five or even more monomers. The properties of polymeric dispersants depend on both the nature of the monomers and their distribution in the polymer. Copolymeric dispersants preferably have the following polymer compositions:

statistically polymerized monomers (e.g. monomers A and B polymerized into ABBAABAB);

alternating polymerized monomers (e.g. monomers A and B polymerized into ABABABAB);

gradient (tapered) polymerized monomers (e.g. monomers A and B polymerized into AAABAABBA-BBB);

block copolymers (e.g. monomers A and B polymerized into AAAAABBBBBB) wherein the block length of each of the blocks (2, 3, 4, 5 or even more) is important for the dispersion capability of the polymeric dispersant;

graft copolymers (graft copolymers consist of a polymeric backbone with polymeric side chains attached to the backbone); and mixed forms of these polymers, e.g. blocky gradient copolymers.

Suitable dispersants are DISPERBYK™ dispersants available from BYK CHEMIE, JONCRYL™ dispersants available from JOHNSON POLYMERS and SOL-SPERSE™ dispersants available from Lubrisol. A detailed list of non-polymeric as well as some polymeric dispersants is disclosed by MC CUTCHEON. Functional Materials, North American Edition. Glen Rock, N.J.: Manufacturing Confectioner Publishing Co., 1990. p. 110-129.

The polymeric dispersant has preferably a number average molecular weight Mn between 500 and 30000, more preferably between 1500 and 10000. The polymeric dispersant has preferably a weight average molecular weight Mw smaller than 100,000, more preferably smaller than 50,000 and most preferably smaller than 30,000.

The pigments are preferably present in the range of 0.01 to 20%, more preferably in the range of 0.05 to 10% by weight and most preferably in the range of 0.1 to 5% by weight, each based on the total weight of the inkjet ink. For white inkjet inks, the white pigment is preferably present in an amount of 3% to 40% by weight of the inkjet ink, and more preferably 5% to 35%. An amount of less than 3% by weight cannot achieve sufficient covering power.

B.3. Resin

The ink jet ink composition according to the invention may further comprise an additional resin. The resin is often added to the ink jet ink formulation to achieve a good adhesion of the pigment to the substrate such as the fibres of the textile fabric or to the surface of non-absorbing substrates such as polypropylene, PET, PVC, . . . . The resin is a polymer and suitable resins can be acrylic based resins, a urethane-modified polyester resin or a polyethylene wax.

Examples of suitable polyurethane resins and their preparations are disclosed in the unpublished patent application EP16196224.6. Some examples of suitable polyurethane dispersions are NEOREZ R-989, NEOREZ R-2005, and NEOREZ R-4000 (DSM NeoResins); BAYHYDROL UH 2606, BAYHYDROL UH XP 2719, BAYHYDROL UH XP 2648, and BAYHYDROL UA XP 2631 (Bayer Material Science); DAOTAN VTW 1262/35 WA, DAOTAN VTW 1265/36WA, DAOTAN VTW 1267/36WA, DAOTAN VTW 6421/42WA, DAOTAN VTW 6462/36WA (Cytec Engineered Materials Inc., Anaheim Calif.); and SANCURE 2715, SANCURE 20041, SANCURE 2725 (Lubrizol Corporation), for example, or a combination of two or more of the above.

Acrylic based resins include polymers of acrylic monomers, polymers of methacrylic monomers, and copolymers of the aforementioned monomers with other monomers. These resins are present as a suspension of particles having an average diameter of about 30 nm to about 300 nm. The acrylic latex polymer is formed from acrylic monomers or methacrylic monomer residues. Examples of monomers of the acrylic latex polymer include, by way of illustration, acrylic monomers, such as, for example, acrylate esters, acrylamides, and acrylic acids, and methacrylic monomers, such as, for example, methacrylate esters, methacrylamides, and methacrylic acids. The acrylic latex polymer may be a homopolymer or copolymer of an acrylic monomer and another monomer such as, for example, a vinyl aromatic monomer including, but not limited to, styrene, styrene butadiene, p-chloromethylstyrene, divinyl benzene, vinyl naphthalene and divinylnaphthalene Some examples of suitable acrylic latex polymer suspensions are, JONCRYL 537 and JONCRYL 538 (BASF Corporation, Port ArthurTX); CARBOSET GA-2111, CARBOSET CR-728, CARBOSET CR-785, CARBOSET CR-761, CARBOSET CR-763, CARBOSET CR-765, CARBOSET CR-715, and CARBOSET GA-4028 (Lubrizol Corporation); NEOCRYL A-1110, NEOCRYL A-1131, NEOCRYL A-2091, NEOCRYL A-1127, NEOCRYL XK-96, and NEOCRYL XK-14 (DSM); and BAYHYDROL AH XP 2754, BAYHYDROL AH XP 2741, BAYHYDROL A 2427, and BAYHYDROL A2651 (Bayer), for example, or a combination of two or more of the above.

The concentration of the resin in the ink jet ink according to the invention is at least 1 wt. % and preferably lower than 30 wt. %, more preferably lower than 20 wt. %.

B. 4. Additives

The aqueous inkjet ink may further comprise a surfactant, a humectant, a biocide, a film-forming agent and a thickener as an additive.

Humectants are preferably incorporated in the inkjet ink to prevent the clogging of nozzles. The prevention is due to its ability to slow down the evaporation rate of the solvents, especially of the water in the ink. The humectant is preferably an organic solvent having a higher boiling point than water. Suitable humectants include triacetin, N-methyl-2-pyrrolidone, glycerol, urea, thiourea, ethylene urea, alkyl urea, alkyl thiourea, dialkyl urea and dialkyl thiourea, dials, including ethanediols, propanediols, propanetriols, butanediols, pentanediols, and hexanediols; glycols, including propylene glycol, polypropylene glycol, ethylene glycol, polyethylene glycol, diethylene glycol, tetraethylene glycol, and mixtures and derivatives thereof. A preferred humectant is glycerol. The humectant is preferably added to the liquid formulation in an amount of 0.1 to 20 wt. % based on the total weight of the liquid.

Any known surfactant may be used in the inkjet ink of the invention. Preferably a glycol surfactant and/or an acetylene alcohol surfactant can be used. The use of the acetylene glycol surfactant and/or the acetylene alcohol surfactant further reduces bleeding to improve printing quality, and also improves the drying property in printing to allow high-speed printing. The acetylene glycol surfactant and/or the acetylene alcohol surfactant is preferably one or more selected from 2, 4, 7, 9-tetramethyl-5-decine-4, 7-diol, alkylene oxide adducts of 2,4,7,9-tetramethyl-5-decine-4, 7-diol, 2,4-dimethyl-5-decin-4-ol, and alkylene oxide adducts of 2,4-dimethyl-5-decin-4-ol. These are available, for example, from Air Products (GB) as Olfine (registered trademark) 104 series and E series, such as Olfine E1 010, or from Nissin Chemical Industry as Surfynol (registered trademark) 465 and Surfynol 61.

A biocide may be added to the ink to prevent unwanted microbial growth, which may occur in the liquid. The biocide may be used either singly or in combination. Suitable biocides for the ink-jet ink of the present invention include sodium dehydroacetate, 2-phenoxyethanol, sodium benzoate, sodium pyridinethion-1-oxide, ethyl p-hydroxybenzoate and 1,2-benzisothiazolin-3-one and salts thereof.

Preferred biocides are Proxel™ GXL and Proxel™ Ultra 5 available from ARCH UK BIOCIDES and Bronidox™ available from COGNIS.

A biocide is preferably added to the aqueous medium in an amount of 0.001 to 3 wt. %, more preferably 0.01 to 1.0 wt. %, each based on the ink liquid.

The inkjet ink may further comprise at least one thickener for viscosity regulation in the liquid. Suitable thickeners include urea or urea derivatives, hydroxyethylcellulose, carboxymethylcellulose, hydroxypropylcellulose, derived chitin, derived starch, carrageenan, pullulan, proteins, poly(styrenesulphonic acid), poly(styrene-co-maleic anhydride), poly(alkyl vinyl ether-co-maleic anhydride), polyacrylamid, partially hydrolyzed polyacrylamid, poly(acrylic acid), poly(vinyl alcohol), partially hydrolyzed poly(vinyl acetate), poly(hydroxyethyl acrylate), poly(methyl vinyl ether), polyvinylpyrrolidone, poly(2-vinylpyridine), poly(4-vinylpyridine) and poly(diallyldimethylammonium chloride).

The thickener is added preferably in an amount of 0.01 to 20 wt. %, more preferably 0.1 to 10 wt. % based on the ink.

C. Printing Method

Printing methods using aqueous inkjet inks comprising the dispersion of the invention include at least the steps of: a) applying the aqueous inkjet ink containing the dispersed particles of the invention by means of an inkjet technique onto a substrate; and optionally step b) applying heat to make the resin of the dispersed particles flow.

In a first step of the printing method according to the invention, a pre-treatment liquid may be preferably applied onto the substrate by spraying, coating, or pad printing. The pre-treatment liquid contains a compound capable of decreasing the flowability of the ink jetted on top of the pre-treatment liquid, or a compound capable of forming aggregates with the pigment of the inkjet ink when jetted on top of the pre-treatment liquid, or a flocculant which flocculates the pigment of the inkjet ink when jetted on top of the pre-treatment liquid. Alternatively, the pre-treatment liquid may also be applied to substrates using an ink jet head or valve jet head. These last means of applying the pre-treatment liquid have the advantage that the amount of required pre-treatment liquid is substantially lower than with the other application methods. By means of an ink jet head, it is possible to apply the pre-treatment liquid onto areas of the substrate where the image should be printed.

Substrate to which the pre-treatment liquid has been applied may be dried before applying the coloured image.

After the application of the pre-treatment liquid of the substrate, the aqueous inkjet ink according to the invention is jetted onto the substrate. Preferably the inkjet ink may comprise a colorant, more preferably a pigment.

After the ink jetting step, the printed substrate is dried and preferably heated. The drying step can be performed at the air, but the heating step must be performed by using heat sources; examples include equipment for forced-air heating, radiation heating such as IR-radiation, including NIR- and CIR radiation, conduction heating, high-frequency drying, and microwave drying. Examples of the heating process include, but are not limited to, heat press, atmospheric steaming, high-pressure steaming and THERMOFIX. Any heat source can be used for the heating process; for example, an infrared ray lamp can be employed. The heat treatment is such that the temperature of the printed image is preferably at 60 to 200° C., more preferably 80 to 160° C. The drying step of the printed image is carried at a temperature preferably below 160° C., more preferably below 100° C., most preferably below 60° C.

In a preferred embodiment of the invention, the printing method is a digital textile printing process wherein the substrate is a textile fabric. This fabric can be made of one type of fibre or blended fibre of two or more selected from the group consisting of cotton, hemp, rayon fibre, acetate fibre, silk, nylon fibre, and polyester fibre. The fabric may be in any form, for example, a woven, knitted, or nonwoven form of the above-mentioned fibres. Heating at 80° C. or higher enables the flow of the resin of the particle according to the invention and leads to the fixation of pigment particles to the fibres of the fabric.

In another preferred printing method, aqueous inkjet inks comprising the dispersion of the invention is to be performed on non-porous substrates such as leather, glass, ceramic, metallic, glass, polymeric surfaces such as polyethylene, polypropylene, polycarbonate, polyvinyl chloride, PMMA, polyesters like polyethylene terephthalate (PET), co-polyesters based on cyclohexyldimethanol (CHDM)= PETG, on 2,5-furandicarboxylic acid, on (FDCA), copolymers of terephtalic acid and ethylene glycol and isosorbide, polyethylene naphthalate (PEN), polylactide (PLA) and polyimide. These substrates may also be primed, e.g. by a pre-treatment liquid or by a white ink. Heating after applying the ink comprising the dispersion of the invention is preferably done at a temperature below 150° C., more preferably 130° C., most preferably between 80° C. and 130° C.

The non-porous substrates may be transparent, translucent or opaque. Preferred opaque substrates includes so-called synthetic paper, like the Synaps™ grades from Agfa-Gevaert which are an opaque polyethylene terephthalate sheet having a density of 1.10 g/cm$^3$ or more.

A preferred ink jet head for the inkjet printing system is a piezoelectric ink jet head. Piezoelectric inkjet jetting is based on the movement of a piezoelectric ceramic transducer when a voltage is applied thereto. The application of a voltage changes the shape of the piezoelectric ceramic transducer in the print head creating a void, which is then filled with ink. When the voltage is again removed, the ceramic expands to its original shape, ejecting a drop of ink from the ink jet head. However, the jetting of the ink according to the present invention is not restricted to piezoelectric inkjet printing. Other inkjet print heads can be used and include various types, such as a continuous type, a thermal print head type and a valve jet type.

If an optothermal converting agent is present in the core of the particles of the invention, the heating mains may be a suitable light source. If the optothermal converting agent consists of one or more infrared dyes, an infrared light source is used. Any infrared light source may be used, as long as at least part of the emitted light is suitable for generation of heat. The infrared curing means may include an infrared laser, an infrared laser diode, infrared LEDs or a combination thereof.

EXAMPLES

1 Measuring methods
1.1. Particle Size Measurement

The particles size of the aqueous dispersions of the Examples were determined with a Mastersizer nano-S Zeta nannoseries.

1.2. Scratch Resistance

Inkjet inks were coated with an automated bar coater using a 10 μm spiral bar head on a polypropylene substrate PP1 and subsequently dried at 80° C. in an oven for 5 min. Dry scratch resistance was evaluated by scratching with a tungsten carbide tipped pen. Next the scratch is rubbed once with a nitrile substrate and the level of delamination was quantified according the criteria in Table 3.

TABLE 3

| Delamination by scratching | Score |
| --- | --- |
| No or very limited trace of scratching | 1 |
| Slight delamination of scratch/substrate slightly visible | 2 |
| Strong delamination of scratch/substrate clearly visible | 3 |

1.3. Solvent Resistance

Ink formulations were coated and dried as described for the scratch resistance measurement method. The solvent resistance was tested by means of wiping the dried film with a swab soaked in isopropanol. The level of solvent resistance was quantified according the criteria in Table 4.

TABLE 4

| Level of solvent attack | Score |
| --- | --- |
| No or very limited influence on film appearance | 1 |
| Slight influence on film appearance/substrate slightly visible | 2 |
| Strong influence on film appearance/substrate strongly visible | 3 |

1.4. Adhesion

Ink formulations were coated and dried as described for the scratch resistance measurement method. The adhesion is evaluated by means of the cross-cut test. The following quotation was given: If no ink coating was removed=1; if some ink coating was removed=2, if a substantial amount of ink was removed=3.

2. Materials

All materials used in the following examples were readily available from standard sources such as Sigma-Aldrich (Belgium) and Acros (Belgium) unless otherwise specified. The water used was demineralised water.

Actone is acetone p.a. supplied by VWR International
Ymer N120 is 1,3 diol polyether supplied by Perstorp
Cab-O-Jet 450C is a commercial cyan pigment dispersion supplied by
Cabot Corporation (15% pigment)
tert-butyl acetoacetate available from Eastman
DMPA is dimethylol propionic acid supplied by Perstorp AB
Triethylamine is triethylamine supplied by Acros
PU-9 is the reproduction of the polyurethane dispersion PU-9, prepared as disclosed in the patent application WO2018/077624.

PYR is 2-pyrrolidone
GLYC is glycerol
HD is 1,2-hexanediol
SURF-1 is Tego Wet 270, a surfactant from Evonik Industries
SURF-2 is Capstone FS3100, a surfactant from Dupont
SURF-3 is Thetawet 4000, a surfactant from Neochem
PP1 is polypropylene Priplak Classic supplied by Antalis Synthesis of Cyclohexane Bis-Acetoacetate (CDM-AA)

For the synthesis of cyclohexane dimethanol-bis-acetoacetate, (0.2 mol) 30 g (0.208 mol) of 4-(hydroxymethyl)cyclohexyl]methanol and 67.5 g of tert-butyl acetoacetate were mixed in a round-bottom flask in 40 ml of xylene. The mixture was heated in an oil-bath at 135° C. for 2 h, under stirring, while distillation of tert-butanol was performed. After cooling the xylene was removed under reduced pressure (rotavopor, 80° C., 60 mbar). The addition of 60 ml isopropanol made the cyclohexane dimethanol bis-acetoacetae (CDM-AA) precipitate. Filtration over a Whatman paper filter (10 μm) with a moderate vacuum, was performed to isolate the product.

Synthesis of a Bisacetoacetate Comprising a Non-Ionic Dispersing Group (YMER-AA)

50 g (0.05 mol) of Ymer N120 was molten in a round-bottom flask at 40° C.

2.1 eq (0.105 mol) of tert-butyl acetoacetate was added. The mixture was heated to 160° C. and t-butanol was removed by distillation. After 2 hours the reaction was completed. Yield was 100%. The obtained compound was purified with preparative column chromatography Normal Phase Silica Flash from Grace. A gradient form methylene chloride (100%) up to ethyl acetate/methylene chloride (80-20%) was applied. The purified fractions were collected and the solvent was evaporated with a rotavapor.

Synthesis of a Bisacetoacetate Comprising an Anionic Dispersing Group (DMPA-AA)

10 g (0.0754 mol, 1 eq) of dimethylol propionic acid (DMPA), was mixed with a magnetic stirrer in a round-bottom flask, together with 24.7 g (0.156 mol, 2.1 eq) of tert-butyl acetoacetate. The mixture was heated till 150° C., and t-butanol was removed by distillation in 2 hours. 2-methyl-3-(3-oxobutanoyloxy)-2-(3-oxobutanoyloxymethyl)propanoic acid was formed. The product yield was 100%.

Synthesis of a Tris-Acetoacetate (TMP-AA)

A mixture of 2.582 kg (16.3 mol) tert. butyl acetoacetate and 0.684 kg (5.1 mol) trimethylol propane was heated to 140° C. while stirring. The formed tert. butanol was removed by distillation over a period of two hours. After two hours, an additional 0.403 kg (2.55 mol) tert. butyl acetoacetate was added. The distillation of tert. butanol was continued for an additional 90 minutes. A nitrogen flow was put through the mixture and the excess of tert. butyl acetoacetate was removed at 140° C. After one hour, the nitrogen flow was removed and the pressure over the mixture was gradually decreased from 105 mbar to 10 mbar to remove all residual tert. butyl acetoacetate. The reaction mixture was allowed to cool down to room temperature.

3. Aqueous Dispersions

Preparation of Inventive Aqueous Dispersions of Cross-linked Vinylogous Urethane Particles Comprising an Anionic Dispersing Group

DISP-1

7 g (22.41 mmol) CDM-AA, 3 g (2.5 mmol) YMER-AA and 0.3 g (0.99 mmol) DMPA-AA were dissolved in 20 ml acetone. 5.45 g (25.9 mmol) bis(4-aminocyclohexyl)methane was added followed by the addition of 24.6 mg (0.129 mmol) p.toluene sulfonic acid monohydrate. After one hour reaction, 20 g dioxolane was added. The reaction was allowed to continue for 4 hours at 56° C., followed by the addition of an additional 20 g dioxolane. 113.25 mg (1.12 mmol) triethyl amine was added and the mixture was allowed to cool down to room temperature. 500 mg (1.29 mmol) TMP-AA was added to the solution. The mixture was stirred at 1200 rpm. Over a period of 15 minutes, 33.75 g water was added dropwise. The mixture was stirred for 5 hours. The aqueous dispersion was obtained by removing the organic solvents at 40° C. at 300 mbar. The average particle size was 50 nm.

DISP-2

7 g (22.41 mmol) CDM-AA, 3 g (2.5 mmol) YMER-AA and 0.3 g (0.99 mmol) DMPA-AA were dissolved in 20 ml acetone. 6.17 g (25.9 mmol) 4,4'-methylenebis(2-methylcyclohexyl amine) was added followed by the addition of 24.6 mg (0.129 mmol) p.toluene sulfonic acid monohydrate. The mixture was refluxed for one and a half hour. An additional 20 ml acetone was added to avoid solidification of the mixture and the reaction was allowed to continue for 5 hours. 20 g dioxolane was added and the reaction was allowed to continue for an additional hour at 56° C. The mixture was allowed to cool down to room temperature. 114.8 mg (1.14 mmol) triethyl amine was added. 500 mg (1.29 mmol) TMP-AA was added to the solution. The mixture was stirred at 1200 rpm. Over a period of 15 minutes, 33.03 g water was added dropwise. The mixture was stirred for 5 hours. The aqueous dispersion was obtained by removing the organic solvents at 40° C. at 300 mbar. The average particle size was 51 nm.

4. Inkjet Inks (INK-1 to INK-3)

The inks were prepared by mixing the components according to Table 5. All weight percentages are based on the total weight of the ink jet ink.

TABLE 5

|  | INK-1 (wt. %) COMP | INK-2 (wt. %) INV | INK-3 (wt. %) INV |
|---|---|---|---|
| PU-9 dispersion | 33.45 | — | — |
| DISP-2 | — | 13.23 | — |
| DISP-3 | — | — | 14.12 |
| SURF-1 | — | 0.6 | 0.6 |
| SURF-2 | 0.6 | — | — |
| SURF-3 | 0.2 | — | — |
| PYR | 20.0 | 16 | 16 |
| HD | 20.0 | 16 | 16 |
| Cab-O-Jet 450C | 13.33 | 13.33 | 13.33 |
| Water | To complete to 100 wt. % | To complete to 100 wt. % | To complete to 100 wt. % |

5. Durability of Coated Inks on Non-Absorbing Substrates

Coatings of comparative ink INK-1 and inventive inks INK-2 and INK-3 onto PP1 have been evaluated for scratch resistance (according to § 1.2.) solvent resistance (according to § 1.3.) and adhesion (according to § 1.4). The results are summarized in Table 6.

TABLE 6

| INK | Adhesion | Dry scratch resist. | Solvent resistance |
|---|---|---|---|
| INK-1 | 2 | 3 | 3 |
| INK-2 | 1 | 2 | 2 |
| INK-3 | 1 | 2 | 2 |

From the results it can be seen that the coatings of the inks comprising the dispersion according to the invention show better image durability on a polypropylene substrate than coatings with comparative inks, although the amount of binder is higher than in the inventive samples. Polypropylene substrates are known by the skilled person as very demanding regarding adhesion, resistance and durability of printed images.

The invention claimed is:

1. An aqueous dispersion of resin particles, the resin particles comprising a dispersing group covalently bonded to a resin and at least one repeating unit of formula I, II and/or III

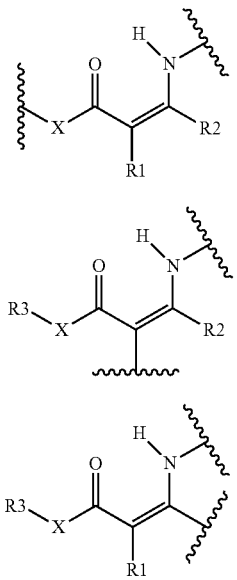

wherein
R1 is selected from the group consisting of hydrogen, a substituted or unsubstituted alkyl group, a substituted or unsubstituted alkenyl group, a substituted or unsubstituted alkynyl group, a substituted or unsubstituted aryl or heteroaryl group, a substituted or unsubstituted aralkyl group, a substituted or unsubstituted alkaryl group, C(=O)R4, and CN;

R2 is selected from the group consisting of hydrogen, a substituted or unsubstituted alkyl group, a substituted or unsubstituted alkenyl group, a substituted or unsubstituted alkynyl group, a substituted or unsubstituted aryl or heteroaryl group, a substituted or unsubstituted aralkyl group, a substituted or unsubstituted alkaryl group, and C(=O)R4;

optionally, R1 and R2 represent the necessary atoms to form a five to eight membered ring;

R3 is selected from the group consisting of a substituted or unsubstituted alkyl group, a substituted or unsubstituted alkenyl group, a substituted or unsubstituted alkynyl group, a substituted or unsubstituted aralkyl group, a substituted or unsubstituted alkaryl group, and a substituted or unsubstituted aryl or heteroaryl group;

R4 is selected from the group consisting of hydrogen, a substituted or unsubstituted alkyl group, a substituted or unsubstituted alkenyl group, a substituted or unsubstituted alkynyl group, a substituted or unsubstituted aryl or heteroaryl group, a substituted or unsubstituted aralkyl group, a substituted or unsubstituted alkaryl group, OR5, and NR6R7;

R5 is selected from the group consisting of a substituted or unsubstituted alkyl group, a substituted or unsubstituted alkenyl group, a substituted or unsubstituted alkynyl group, a or unsubstituted aralkyl group, a substituted or unsubstituted alkaryl group, and a substituted or unsubstituted aryl or heteroaryl group;

R6 and R7 are independently selected from the group consisting of hydrogen, a substituted or unsubstituted alkyl group, a substituted or unsubstituted alkenyl group, a substituted or unsubstituted alkynyl group, a substituted or unsubstituted aralkyl group, a substituted or unsubstituted alkaryl group, and a substituted or unsubstituted aryl or heteroaryl group;

optionally, R6 and R7 represent the necessary atoms to form a five to eight membered ring;

X is selected from the group consisting of O, NR8, and CR9R10;

R8, R9, and R10 are independently selected from the group consisting of hydrogen, a substituted or unsubstituted alkyl group, a substituted or unsubstituted alkenyl group, a substituted or unsubstituted alkynyl group, a substituted or unsubstituted aralkyl group, a substituted or unsubstituted alkaryl group, and a substituted or unsubstituted aryl or heteroaryl group;

optionally, R8 and R3 represent the necessary atoms to form a five to eight membered ring;

optionally, any of R3, R9 and R10 represent the necessary atoms to form a five to eight membered ring;

and which is obtained by contacting in a liquid;
  i) a compound A comprising two functional groups selected from the group consisting of functional groups —X—C(=O)—CHR1-C(=O)—R2, —X—C(=O)—C≡C—R2, and —X—C(=O)—CR1=CR2-NR11R12, wherein R11 and R12 are independently selected from the group consisting of hydrogen, a substituted or unsubstituted alkyl group, a substituted or unsubstituted alkenyl group, a substituted or unsubstituted alkynyl group, a substituted or unsubstituted aralkyl group, a substituted or unsubstituted alkaryl group, and a substituted or unsubstituted aryl or heteroaryl group;
  ii) a compound B comprising two functional groups selected from the group consisting of —NH$_2$, —NH$_3^+$, and —N=C=O; and
  iii) a crosslinking agent C, wherein the crosslinking agent is a compound comprising at least three functional groups selected from the group consisting of functional groups —X—C(=O)—CHR1-C(=O)—R2, —X—C(=O)—C≡C—R2, and —X—C(=O)—CR1=CR2-NR11R12 and/or a compound comprising at least three functional groups selected from the group consisting of —NH$_2$, —NH$_3^+$, and —N=C=O;
  wherein compound A and/or compound B comprises a dispersing group and wherein the dispersing group is a polyethylene oxide group, an anionic dispersing group selected from the group consisting of a carboxylic acid or salt thereof, a sulfonic acid or salt thereof, a phosphoric acid ester or salt thereof and a phosphonic acid or salt thereof, or a cationic dispersing group selected from the group consisting of an ammonium group, a sulfonium group, and a phosphonium group.

2. The aqueous dispersion according to claim 1 wherein the weight of the crosslinking agent is between 0.5 wt. % and 10 wt. %, with respect to the weight of the resin.

3. The aqueous dispersion according to claim 1 wherein the resin has a moiety according to formula I and X represents O.

4. The aqueous dispersion according to claim 1 wherein the compound A is a bisacetoacetate monomer or oligomer according to general formula IV

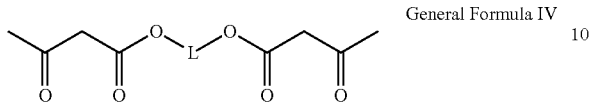

General Formula IV wherein L is a divalent linking group of at least two carbon atoms and comprises a dispersing group.

5. The aqueous dispersion according to claim 1 wherein the dispersing group is a polyalkylene oxide chain.

6. The aqueous dispersion according to claim 4 wherein the dispersing group is a polyalkylene oxide chain.

7. The aqueous dispersion according to claim 1 wherein the dispersing group is selected from the group consisting of a carboxylic acid or salt thereof, an ammonium group, and a polyethylene oxide group.

8. The aqueous dispersion according to claim 4 wherein the dispersing group is selected from the group consisting of a carboxylic acid or salt thereof, an ammonium group, and a polyethylene oxide group.

9. The aqueous dispersion according to claim 5 further comprising a second dispersing group that is covalently bonded to the resin, wherein the second dispersing group is an anionic or cationic dispersing group.

10. An aqueous ink jet ink comprising a pigment and the aqueous dispersion of resin particles as defined in claim 1, wherein the resin particles represent 30 wt. % or less with respect to the total weight of the ink.

11. An aqueous ink jet ink comprising a pigment and the aqueous dispersion of resin particles as defined in claim 4, wherein the resin particles represent 30 wt. % or less with respect to the total weight of the ink.

12. A method of producing the aqueous dispersion as defined in claim 1 comprising:
 a) mixing in a liquid, a compound A comprising two functional groups selected from the group consisting of functional groups —X—C(=O)—CHR1-C(=O)—R2, —X—C(=O)—C≡C—R2, and —X—C(=O)—CR1=CR2-NR11R12, wherein R11 and R12 are independently selected from the group consisting of hydrogen, a substituted or unsubstituted alkyl group, a substituted or unsubstituted alkenyl group, a substituted or unsubstituted alkynyl group, a substituted or unsubstituted aralkyl group, a substituted or unsubstituted alkaryl group, and a substituted or unsubstituted aryl or heteroaryl group, with a compound B comprising two functional groups selected from the group consisting of —NH$_2$, —NH$_3^+$ and —N=C=O and wherein compound A or B further comprise a dispersing group so as to form a reaction mixture; and a crosslinking agent, the crosslinking agent C being a compound comprising at least three functional groups selected from the group consisting of functional groups —X—C(=O)—CHR1-C(=O)—R2, —X—C(=O)—C≡C—R2, and —X—C(=O)—CR1=CR2-NR11R12 and/or a compound comprising at least three functional groups selected from the group consisting of —NH$_2$, —NH$_3^+$, and —N=C=O;
 b) allowing the reaction of compound A with compound B and with compound C at room temperature or higher;
 c) adding water to the reaction mixture; and
 d) optionally removing the solvent from the reaction mixture.

13. An inkjet printing method comprising:
 a) jetting an inkjet ink as defined in claim 10 on a substrate to obtain an image; and
 b) applying heat to the printed image to achieve a temperature of the image between 60 and 200° C.

14. The inkjet printing method according to claim 13 wherein the substrate is a non-porous substrate.

15. The aqueous dispersion according to claim 2 wherein the resin has a moiety according to formula I and X represents O.

* * * * *